US010923949B2

(12) United States Patent
Wang et al.

(10) Patent No.: US 10,923,949 B2
(45) Date of Patent: Feb. 16, 2021

(54) WIRELESS POWER SUPPLY DEVICE AND ELECTRICAL EQUIPMENT

(71) Applicant: Tyco Electronics (Shanghai) Co. Ltd., Shanghai (CN)

(72) Inventors: Shaoyong Wang, Shanghai (CN); Yuming Song, Shanghai (CN); Feng Dai, Shanghai (CN); Mingjie Fan, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 103 days.

(21) Appl. No.: 16/009,743

(22) Filed: Jun. 15, 2018

(65) Prior Publication Data

US 2018/0294670 A1 Oct. 11, 2018

Related U.S. Application Data

(63) Continuation of application No. PCT/EP2016/081460, filed on Dec. 16, 2016.

(30) Foreign Application Priority Data

Dec. 16, 2015 (CN) .......................... 201510946870.2

(51) Int. Cl.
*H01F 27/42* (2006.01)
*H01F 37/00* (2006.01)
(Continued)

(52) U.S. Cl.
CPC .............. *H02J 50/10* (2016.02); *H01F 27/24* (2013.01); *H01F 38/14* (2013.01); *H02J 7/0042* (2013.01);
(Continued)

(58) Field of Classification Search
CPC .......... H02J 50/10; H02J 7/0042; H02J 50/40; H02J 50/90; F25D 23/00; F25D 2400/40; H01F 27/24; H01F 38/14
See application file for complete search history.

(56) References Cited

U.S. PATENT DOCUMENTS

| 2007/0091519 | A1* | 4/2007 | Abe | H01F 38/14 361/38 |
| 2007/0141887 | A1* | 6/2007 | Kuo | H01F 38/14 439/281 |

(Continued)

FOREIGN PATENT DOCUMENTS

| EP | 2224572 A2 | 9/2010 |
| WO | 2010080739 A2 | 7/2010 |
| WO | 2014179869 A1 | 11/2014 |

OTHER PUBLICATIONS

PCT Notification of Transmittal of the International Search Report and the Written Opinion of the International Searching Authority, or the Declaration, dated Mar. 17, 2017, 15 pages.

*Primary Examiner* — Rexford N Barnie
*Assistant Examiner* — Rasem Mourad
(74) *Attorney, Agent, or Firm* — Barley Snyder

(57) ABSTRACT

A wireless power supply device comprising a plurality of transmitting coil assemblies mounted at a plurality of different positions of an electrical equipment, a plurality of control switches disposed at the plurality of different positions and configured to switch on and off the transmitting coil assemblies, and a single receiving coil assembly mounted on a carrier of the electrical equipment. The transmitting coil assembly mounted at one position of the plurality of different positions is disconnected by switching off the control switch provided at the one position before the carrier is mounted at one position, and is connected by switching on the control switch provided at the one position (Continued)

after the carrier is mounted at the one position, such that the single receiving coil assembly is electromagnetically coupled with the transmitting coil assembly at the one position.

9 Claims, 5 Drawing Sheets

(51) Int. Cl.
*H01F 38/00* (2006.01)
*H02J 50/10* (2016.01)
*H01F 38/14* (2006.01)
*H02J 50/40* (2016.01)
*H02J 50/90* (2016.01)
*H02J 7/00* (2006.01)
*H01F 27/24* (2006.01)

(52) U.S. Cl.
CPC .............. *H02J 50/40* (2016.02); *H02J 50/90* (2016.02); *F25D 2400/40* (2013.01)

(56) References Cited

U.S. PATENT DOCUMENTS

| 2008/0315735 | A1* | 12/2008 | Fabbro | F25D 25/00 312/223.6 |
| 2013/0241478 | A1* | 9/2013 | Azancot | H01F 38/14 320/108 |
| 2016/0094051 | A1* | 3/2016 | Soar | H02J 50/12 307/9.1 |

* cited by examiner

WIRELESS POWER SUPPLY DEVICE AND ELECTRICAL EQUIPMENT

CROSS-REFERENCE TO RELATED APPLICATIONS

This application is a continuation of PCT International Application No. PCT/EP2016/081460, filed on Dec. 16, 2016, which claims priority under 35 U.S.C. § 119 to Chinese Patent Application No. 201510946870.2, filed on Dec. 16, 2015.

FIELD OF THE INVENTION

The present invention relates to a wireless power supply device and, more particularly, to an electrical equipment having the wireless power supply device.

BACKGROUND

Recent advances in wireless power technology have improved convenience in powering moving parts of electrical equipment. Wireless power technology avoids issues of safety, lifetime, and maintenance of the electrical equipment by eliminating the presence of physical wear. Wireless power also imposes less design constraints on the electrical equipment, thereby increasing an aesthetic quality and functionality of the electrical equipment, especially consumptive electrical equipment such as household appliances.

A transmitting module and a receiving module of a known wireless power supply device are in one-to-one correspondence, that is, one transmitting module corresponds to one receiving module. Currently, wireless power supply technology is based on an electromagnetic coupling principle and the wireless power supply device has a transmitting coil and a receiving coil. One transmitting coil is coupled with one receiving coil; when the transmitting coil and receiving coil come close to each other, they are electromagnetically coupled.

In practice, however, a load of an electrical equipment may be placed at different positions as necessary. For example, in a typical refrigerator shown in FIG. 1, a position of a shelf 11 is usually variable, and the user selectively places the shelves 11 at an appropriate position of different positions A1, A2 and A3 which are adjacent in a vertical direction. In order to wirelessly supply power to a load (e.g., a lighting lamp, a display lamp, etc.) mounted on the shelf 11, transmitting modules are normally placed at the positions A1, A2, A3, respectively. In this way, at whatever position A1, A2, A3 the shelf 11 is placed, the receiving module on the shelf 11 is electromagnetically coupled to a corresponding transmitter module, thereby powering the load on the shelf 11. However, in the prior art, all of the three transmitting modules at positions A1, A2, and A3 are in operation at any moment, resulting in an energy waste.

SUMMARY

A wireless power supply device comprising a plurality of transmitting coil assemblies mounted at a plurality of different positions of an electrical equipment, a plurality of control switches disposed at the plurality of different positions and configured to switch on and off the transmitting coil assemblies, and a single receiving coil assembly mounted on a carrier of the electrical equipment. The transmitting coil assembly mounted at one position of the plurality of different positions is disconnected by switching off the control switch provided at the one position before the carrier is mounted at one position, and is connected by switching on the control switch provided at the one position after the carrier is mounted at the one position, such that the single receiving coil assembly is electromagnetically coupled with the transmitting coil assembly at the one position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
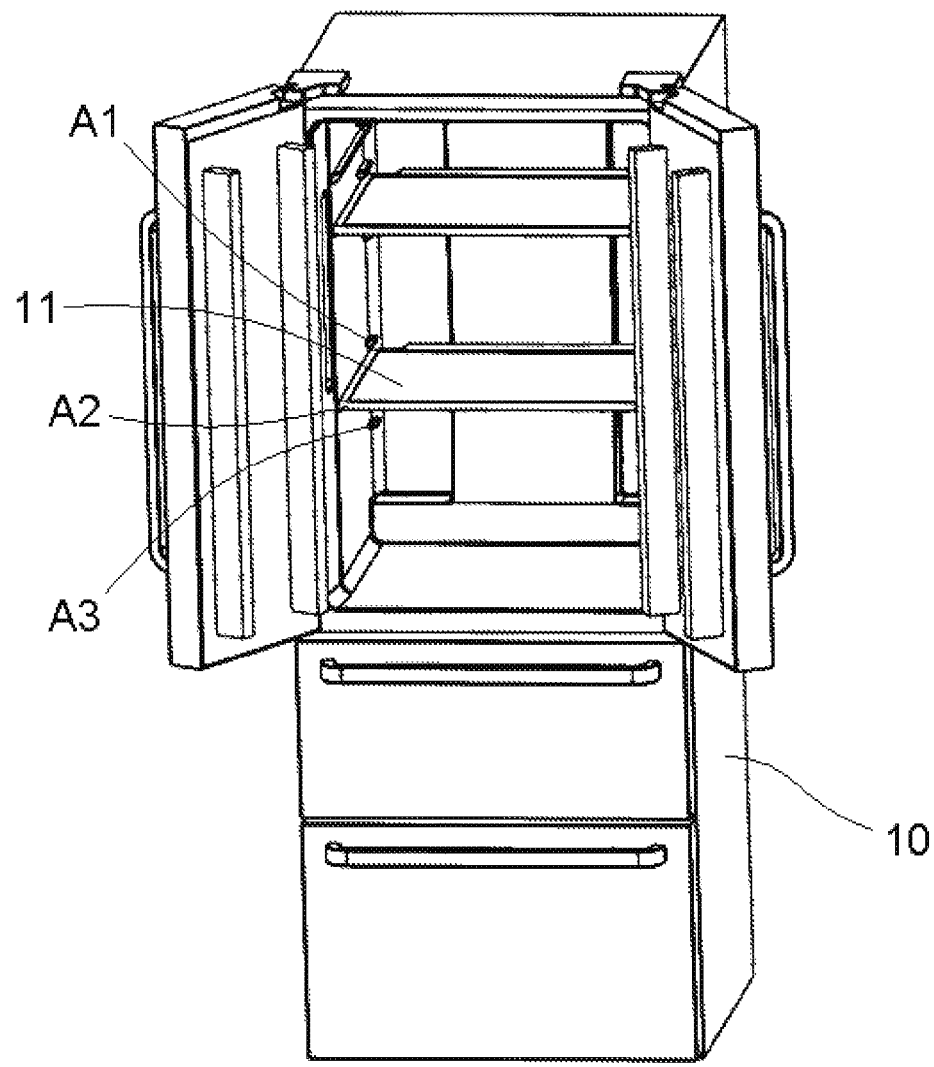
FIG. 1 is a perspective view of an electrical equipment known in the art.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

For convenience of illustration, embodiments of the present invention will be described in the context of the refrigerator shown in FIG. 1. However, the electric appliance of the present invention is not limited to the illustrated embodiment, but may be other electrical equipment such as a washing machine, an air conditioner, or the like. Further, references to the refrigerator of FIG. 1 in the following description are merely to provide an exemplary frame of reference for the location of the embodiments described with reference to FIGS. 2-6 with respect to the positions A1, A2, A3 and the shelf 11 shown in FIG. 1, and do not suggest that any of the elements shown in FIGS. 2-6 and described below are known.

Figure 2:
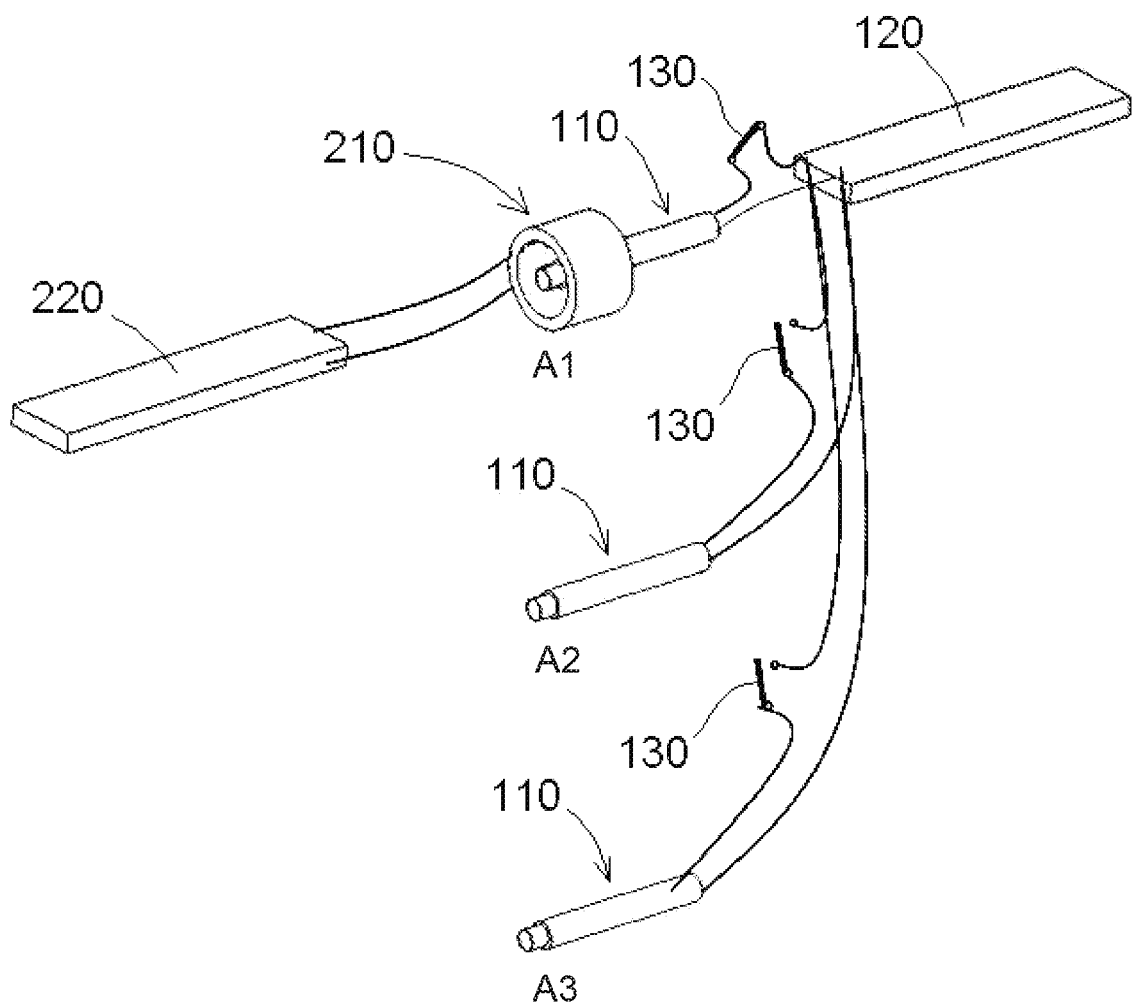
FIG. 2 is a perspective view of a wireless power supply device according to an embodiment.
Figure 3:
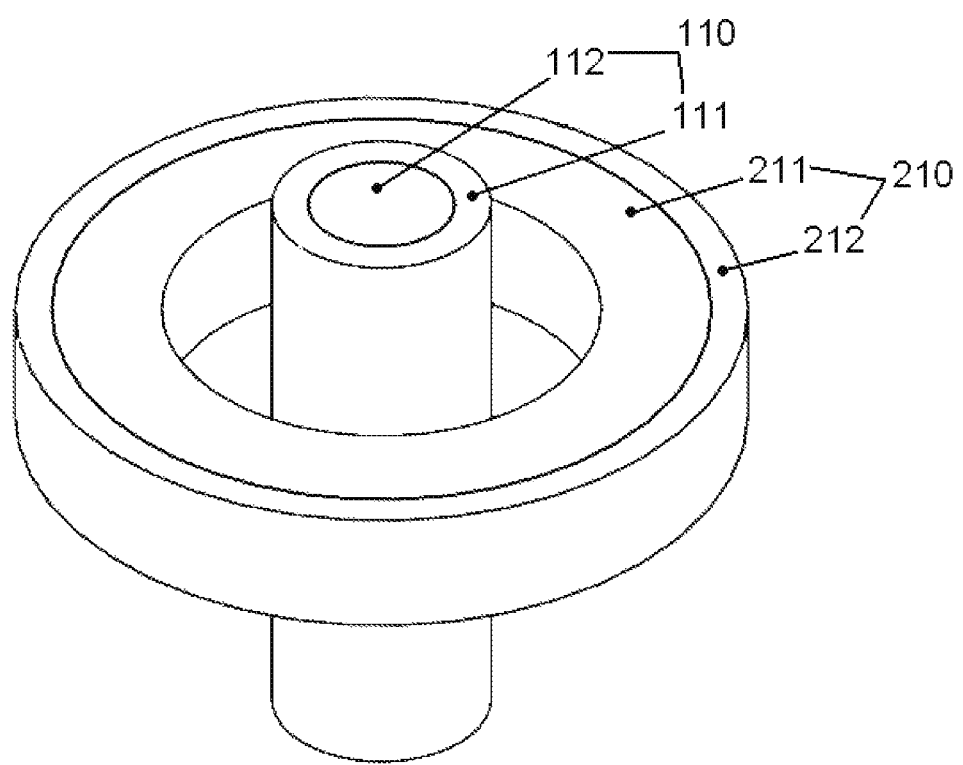
FIG. 3 is a perspective view of a transmitting coil assembly and a receiving coil assembly of the wireless power supply device of FIG. 2.

A wireless power supply device according to an embodiment is shown in FIGS. 2 and 3. The wireless power supply device comprises a plurality of transmitting coil assemblies 110, a plurality of control switches 130, and a single receiving coil assembly 210.

As shown in FIG. 2, the plurality of transmitting coil assemblies 110 are respectively mounted at different positions A1, A2 and A3 on the electrical equipment; each of the transmitting coil assemblies 110, as shown in FIG. 3, has a transmitting coil 111 and a first magnetic core 112. In the embodiment shown in FIGS. 2 and 3, the transmitting coil 111 is a cylindrical coil and the first magnetic core 112 has a cylindrical shape and is disposed inside the transmitting coil 111.

The plurality of control switches 130, as shown in FIG. 2, are respectively provided at different positions A1, A2 and A3, and are constructed to switch on and off the transmitting coils 111 of the plurality of transmitting coil assemblies 110.

The single receiving coil assembly 210, as shown in FIG. 3, has a single receiving coil 211 and a single second magnetic core 212. In an embodiment, the single receiving coil assembly 210 is mounted on a carrier of the electrical equipment, such as the shelf 11. In the embodiment shown in FIGS. 2 and 3, the receiving coil 211 is a cylindrical coil and the second magnetic core 212 has a hollow cylindrical shape and is disposed outside the transmitting coil 111.

In an embodiment, as shown in FIGS. 2 and 3, the transmitting coil 111 mounted at one position of the plurality of different positions A1, A2 and A3 is disconnected by switching off the control switch 130 provided at the one position before the shelf 11 is mounted at the one position. The transmitting coil 111 mounted at one position of the plurality of different positions A1, A2 and A3, for example the position A1 shown in FIG. 2, is connected by switching on the control switch 130 provided at position A1 after the shelf 11 is mounted at position A1, such that the single receiving coil 211 is electromagnetically coupled with the transmitting coil 111 at the position A1. In the embodiment of FIGS. 2 and 3, after the shelf 11 is installed at position A1, for example, the transmitting coil assembly 110 is positioned in the internal space of the receiving coil 211 for electromagnetic coupling between the coils 111, 211.

The wireless power supply device, as shown in FIGS. 2 and 3, further comprises a first circuit board 120 installed on the electrical equipment. The transmitting coils 111 of the plurality of the transmitting coil assemblies 110 are connected in parallel to the first circuit board 120. The transmitting coils 111 may be electrically connected to a power source of the electrical equipment via the first circuit board 120.

The wireless power supply device, as shown in FIGS. 2 and 3, further comprises a second circuit board 220 installed on the electrical equipment. The single receiving coil 211 is electrically connected to the second circuit board 220. A load, such as a lighting lamp or a display lamp, is electrically connected to the single receiving coil 211 via the second circuit board 220.

In the embodiment shown in FIGS. 2 and 3, the control switch 130 is a normal open press mechanical switch. The control switch 130 is connected in series between one corresponding transmitting coil 111 and the first circuit board 120. After the shelf 11 is installed at one position of the different positions A1, A2 and A3, the shelf 11 presses the control switch 130 provided at the one position, such that the control switch 130 is shifted to a closed state. The transmitting coil 111 installed at the one position is then turned on, such that the single receiving coil 211 is electromagnetically coupled with the transmitting coil 111 installed at the one position.

In another embodiment, the control switch 130 is a normal open magnetic actuated switch. The control switch 130 is connected in series between one corresponding transmitting coil 111 and the first circuit board 120. After the shelf 11 is installed at one position of the different positions A1, A2 and A3, a magnet installed on the shelf 11 applies magnetic force to the control switch 130 provided at the one position, such that the control switch 130 is shifted to a closed state. The transmitting coil 111 installed at the one position is then turned on, such that the single receiving coil 211 is electromagnetically coupled with the transmitting coil 111 installed at the one position. In other embodiments, the control switch 130 could be any appropriate type of switch known in the art such as a sound switch, a light switch, or an electronic switch.

Figure 4:
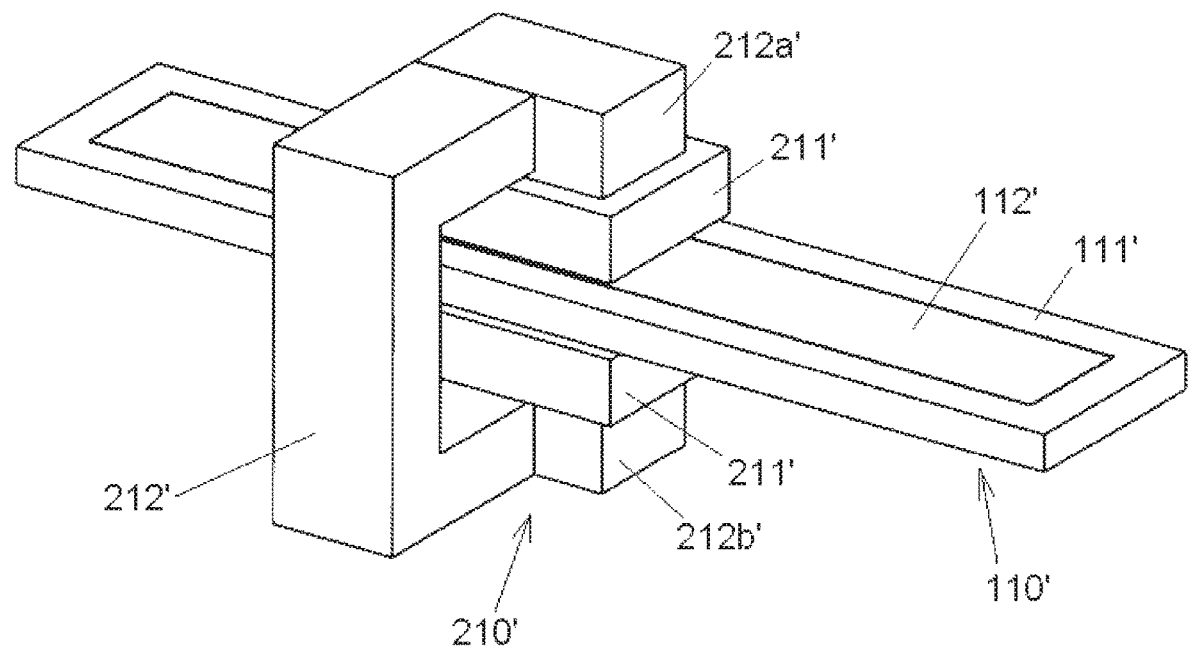
FIG. 4 is a perspective view of a transmitting coil assembly and a receiving coil assembly of a wireless power supply device according to another embodiment.

A transmitting coil assembly 110' and a receiving coil assembly 210' of a wireless power supply device according to another embodiment is shown in FIG. 4.

As shown in FIG. 4, the transmitting coil assembly 110' comprises a first magnetic core 112' and a transmitting coil 111'. The receiving coil assembly 210' comprises a second magnetic core 212' and a receiving coil 211'. The first magnetic core 112' has a rectangular parallelepiped shape and the transmitting coil 111' is wound around an outer circumference of the first magnetic core 112'. The second magnetic core 212' has a U-shaped frame with two opposite ends 212a', 212b'; the receiving coil 211' is wound on each of the two ends 212a', 212b' of the second magnetic core 212'.

In the embodiment shown in FIG. 4, after the shelf 11 is installed at one position of the different positions A1, A2 and A3, the transmitting coil assembly 110' is located between the ends 212a', 212b' of the second magnetic core 212'. The single receiving coil 211' and the transmitting coil 111' installed at the one position are then adjacent to each other and electromagnetically coupled to each other.

Figure 5:
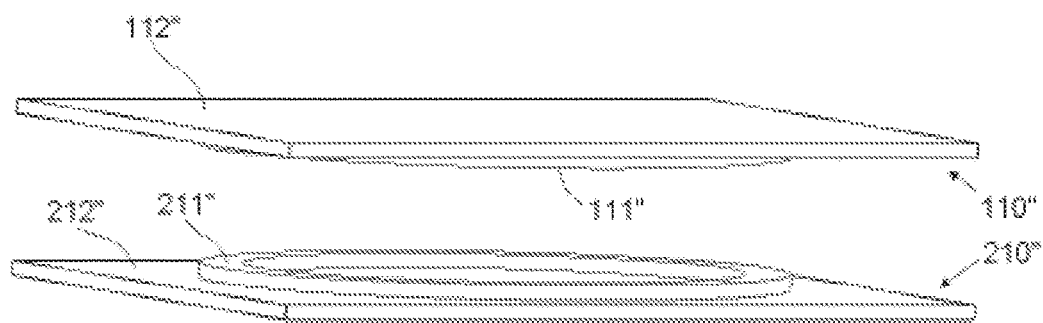
FIG. 5 is a perspective view of a transmitting coil assembly and a receiving coil assembly of a wireless power supply device according to another embodiment.

A transmitting coil assembly 110" and a receiving coil assembly 210" of a wireless power supply device according to another embodiment is shown in FIG. 5.

As shown in FIG. 5, the transmitting coil assembly 110" comprises a first magnetic core 112" and a transmitting coil 111". The receiving coil assembly 210" comprises a second magnetic core 212" and a single receiving coil 211". The first magnetic core 112" has a flat plate shape and the transmitting coil 111" has a ring shape, the transmitting coil 111" is disposed on a surface of the first magnetic core 112". The second magnetic core 212" has a flat plate shape and the receiving coil 211" has a ring shape, the receiving coil 211" is disposed on a surface of the second magnetic core 212" which faces the transmitting coil 111".

In the embodiment of FIG. 5, after the shelf 11 is installed at one position of the different positions A1, A2 and A3, the transmitting coil assembly 110" and the receiving coil assembly 210" are in a position parallel to each other and facing each other. The single receiving coil 211" and the transmitting coil 111" installed at the one position are then adjacent to each other and electromagnetically coupled to each other.

In the various embodiments described above with reference to FIGS. 2-5, at the time that the load is installed at one position of the positions A1, A2, A3, only the transmitting coil assembly 110, 110', 110" at the one position is in operation and the rest of the transmitting coil assemblies 110, 110', 110", are out of operation, saving energy.

Figure 6:
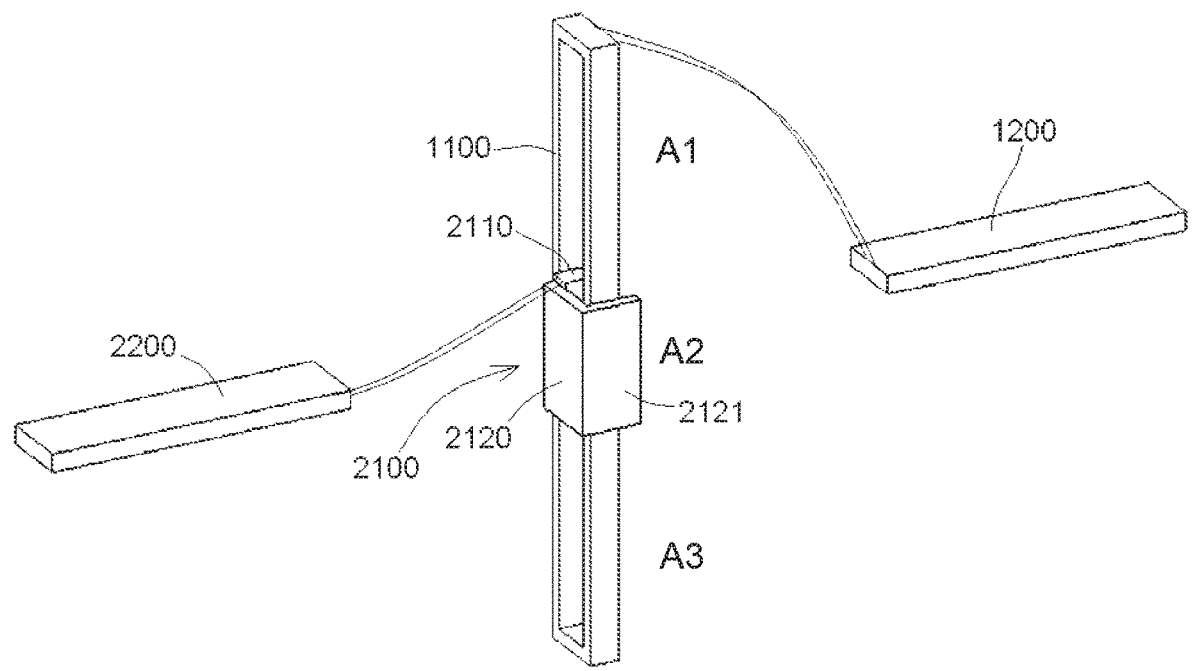
FIG. 6 is a perspective view of a wireless power supply device according to another embodiment.

A wireless power supply device according to another embodiment is shown in FIG. 6. The wireless power supply device comprises a single transmitting coil assembly 1100 and a single receiving coil assembly 2100.

In the embodiment shown in FIG. 6, the single transmitting coil assembly 1100 is mounted on the electrical equipment and extends to the positions A1, A2 and A3; the single transmitting coil 1100 has a relative long length and covers the different positions A1, A2 and A3. The single receiving coil assembly 2100 is mounted on a carrier of the electrical equipment, such as the shelf 11, and comprises a single receiving coil 2110 and a single magnetic core 2120. After the shelf 11 is mounted at one position of the different positions A1, A2 and A3, the single receiving coil 2110 and the single transmitting coil 1100 are electromagnetically coupled. The self-inductance of the transmitting coil 100 and the receiving coil 2110 and the mutual inductance therebetween are almost constant at the plurality of different positions A1, A2, A3, thus ensuring a stable transporting power.

The single transmitting coil 1100, as shown in FIG. 6, has a rectangular parallelepiped frame shape. In other embodiments, the transmitting coil 1100 is not limited to the rectangular parallelepiped shape, and it may comprise a coil with any other appropriate shape, as long as the strength of the internal magnetic field of the coil is evenly distributed when energized. The magnetic core 2120 of the single receiving coil assembly 2100 has a U-shaped frame and has two opposite ends 2121, 2121, the single receiving coil 2110 being wound on one end 2121 of the magnetic core 2120. In an embodiment, the transmitting coil 1100 has a length of about 100 mm, a width of about 12 mm, and a thickness of about 5 mm; the receiving coil 2110 has a length of about 22 mm, a width of about 4 mm, and a thickness of about 7 mm. The magnetic core 2120 has a length of about 20 mm and a thickness of about 2 mm.

After the shelf 11 is installed at any one of the different positions A1, A2 and A3, one end 2121 of the magnetic core 2120 and the single receiving coil 2110 wound on the one end are positioned in an internal space of the single transmitting coil 1100, and the other end 2121 of the magnetic core 2120 is positioned outside of the single transmitting coil 1100. The single receiving coil 2110 and the transmitting coil 1100 mounted at the one position are thus adjacent to each other and electromagnetically coupled to each other.

The wireless power supply device, as shown in FIG. 6, further comprises a first circuit board 1200 mounted on the electrical equipment. The single transmitting coil 1100 is electrically connected to the first circuit board 1200. In an embodiment, the single transmitting coil 1100 is electrically connected to the power source of the electrical equipment via the first circuit board 1200.

The wireless power supply device, as shown in FIG. 6, further comprises a second circuit board 2200 mounted on the electrical equipment. The single receiving coil 2110 is electrically connected to the second circuit board 2200. In an embodiment, the load is electrically connected to the single receiving coil 2110 via the second circuit board 2200.

What is claimed is:

1. An electrical equipment, comprising: a carrier selectively mountable in a plurality of different positions within an interior space of the electrical equipment and having a load; and a wireless power supply device adapted to supply power to the load, including: a plurality of transmitting coil assemblies mounted at the plurality of different positions within the electrical equipment, each of the transmitting coil assemblies having a cylindrical transmitting coil and a cylindrical magnetic core disposed inside of the transmitting coil; a first circuit board mounted within the electrical equipment, the transmitting coils of the plurality of the transmitting coil assemblies are connected in parallel to the first circuit board; a plurality of control switches disposed at the plurality of different positions within the electrical equipment and configured to switch on and off the transmitting coils of the plurality of transmitting coil assemblies, each control switch connected in series between one transmitting coil and the first circuit board, and after the carrier is mounted at the one position of the plurality of different positions, the carrier presses the control switch provided at the one position to switch the control switch to a closed state; a single receiving coil assembly mounted on the carrier and having a single receiving cylindrical coil and a single second magnetic core having a hollow cylindrical shape, the single receiving coil assembly configured to receive one of the plurality of transmitting coil assemblies through an internal space thereof in a direction of insertion of the carrier into the electrical equipment as the carrier is mounted in one of the plurality of positions within the electrical equipment, the transmitting coil mounted at one position of the plurality of different positions is disconnected by switching off the control switch provided at the one position before the carrier is mounted at one position, and the transmitting coil mounted at the one position of the plurality of different positions is connected by switching on the control switch provided at the one position after the carrier is mounted at the one position, such that the single receiving coil is electromagnetically coupled with the transmitting coil at the one position; and a second circuit board mounted on the carrier, the single receiving coil being electrically connected to the second circuit board.

2. The electrical equipment of claim 1, wherein the first circuit board is adapted to electrically connect the plurality transmitting coils to a power source of the electrical equipment.

3. The electrical equipment of claim 1, wherein the second circuit board electrically connects the single receiving coil to the load.

4. The electrical equipment of claim 1, wherein the load comprises a lighting lamp.

5. The electrical equipment of claim 1, wherein the load comprises a display lamp.

6. The electrical equipment of claim 1, wherein each of the plurality of control switches is a normal open mechanical switch.

7. The electrical equipment of claim 1, wherein each of the plurality of control switches is a normal open magnetic switch.

8. The electrical equipment of claim 1, wherein the carrier comprises a shelf moveable between the plurality of different positions by a user.

9. The electrical equipment of claim 8, wherein the electrical equipment comprises a refrigerator.

* * * * *